Feb. 12, 1935. M. L. WATSON ET AL 1,990,806
CONVEYER ROLLER
Filed June 1, 1931
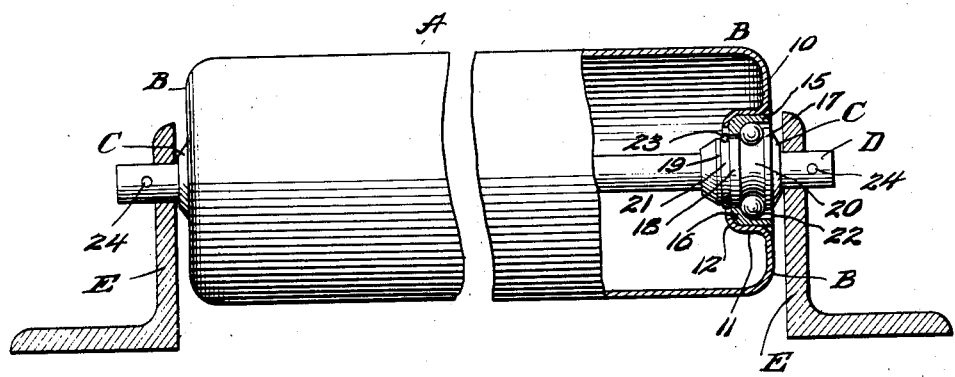
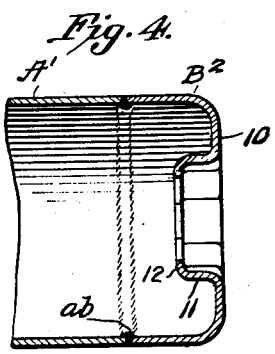
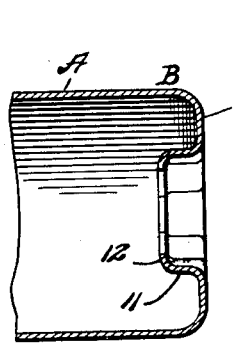
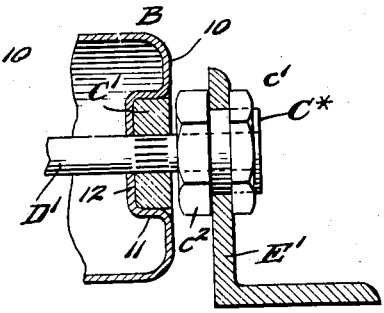
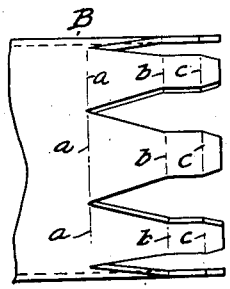
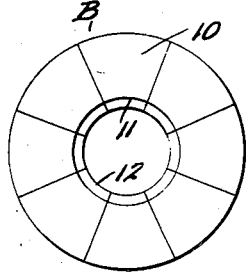
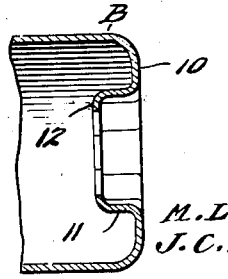
Inventors
M. L. Watson
J. C. Walter
By B. J. Stockman
Attorney Patented Feb. 12, 1935

1,990,806

UNITED STATES PATENT OFFICE 1,990,806

CONVEYER ROLLER

Mervin L. Watson, Chicago, Ill., and John C. Walter, Cincinnati, Ohio, assignors to The Alvey-Ferguson Company, Cincinnati, Ohio, a corporation of Ohio Application June 1, 1931, Serial No. 541,501

11 Claims. (Cl. 193—37)

One important purpose of this invention is to provide a roller body which includes a tubular circumferential part and ends having outer circumferential portions in an edgewise relation to opposite ends of said part and integrally united therewith, and in which each of said ends is formed to provide an outwardly open bearing seat into which an appropriate supporting element, to be interposed between the roller body and shaft, will be insertible by endwise pressure and will be so tightly grasped by the wall of the seat as to be held by frictional engagement with said wall. Each of said supporting elements, in practice, may be either a bearing unit of friction-reducing nature or a sealing plug, whichever is indicated to be preferable in a given installation. They are, as shown, interposed between the roller and shaft and support said body from said shaft.

Another important purpose of the invention is to provide a roller, comprising said body and the before mentioned bearing unit or sealing plug, which will possess maximum strength and will present an exceptionally neat appearance and be of exceptionally well balanced construction.

A further important purpose is to provide a process by which the roller body may be inexpensively produced.

The accompanying drawing shows certain specifically different roller structures included within the scope of the claims of the instant application. In said drawing:

Fig. 1 is a view, partly in elevation and partly in section of a roller body having the aforesaid ends, in which said ends and the intermediate part of the body are integrally united by being formed from a single piece of tubing. This view also shows supporting elements in the form of ball-bearing units in the seats formed in the ends of the roller body, and also shows the side members of the frame of a gravity conveyer of which the roller forms a part;

Fig. 2 is a detail sectional view of the construction of either end of the roller body shown in Fig. 1;

Fig. 3 is a detail of one end of a roller in which the bearing seats in the end members are sealed by supporting elements of non-ball bearing nature, and also shows the corresponding side member of the conveyer frame and a bearing member for supporting the corresponding end of the roller shaft in said frame member;

Fig. 4 is a sectional view of one end of a roller body having end members formed separately from its intermediate part and integrally united therewith by butt welds;

Fig. 5 is a detail view of one end of a roller body showing the serrations which are formed therein to enable it to be most easily shaped to provide the bearing seat therein and to give resilience to said seat to enable it tightly to grasp the bearing unit; and Fig. 6 is an elevation and Fig 7 a sectional view of said end of the roller body when the serrated portion thereof has been bent over to its final form.

A roller constructed in accordance with this invention has its body formed in part of a tubular section (marked A in Figs. 1 and 2, and A' in Fig. 4) and in part of end members (marked B² in Fig. 4 and B in the remaining figures) integrally united with each other and formed from sheet steel of a suitable gauge. Fig. 4 exemplifies a construction in which the end members, B², are formed separately from the tubular section A' and integrally united to the latter by circumferential welds of electrical or other suitable nature, along the line $ab$: and the remaining figures exemplify a construction in which the need for welding the end members (B) to the tubular section (A) as the means for integrally uniting the tubular section and end members with each other, is eliminated, said end members being formed by bending the ends of a single tube having a length sufficient to provide the tubular section and also the end members.

Each end member is formed with serrations and the teeth formed by said serrations are bent to form a flange 10 arranged perpendicular to the axis of the roller and which partially closes the corresponding end of the body and has an axial opening from which a second flange 11 projects inwardly in a concentric relation with the axis of the roller and the outer circumferential part of the body. The flanges 10 have their outer peripheries merged with the longitudinal parts of the bodies and their inner peripheries merged with the inwardly extending flanges, both on outwardly curved lines. By reason of these curvatures and the serrations, and since the roller bodies are made from sheet steel, the flanges 11, which form the outer walls of bearing seats, will have sufficient elasticity to permit them to yield in the forcible insertion into said seats of the supporting elements, (i. e. the bearing units or sealing members hereinafter described) and to tightly grip said elements when the latter have reached their final position in the said seats. It is considered to be highly advantageous and, accordingly, it is greatly preferred, to form the inner end of each flange 11 with a lip 12 which extends toward the axis of the roller and co-operates with the flange 10 in imparting great radial strength to the roller body as well as providing a back wall for the corresponding bearing seat in position to be engaged by the inner end of a supporting element, such as the ball bearing unit or plug now to be described, and thereby to act as a stop which prevents a too deep insertion of the supporting element into the seat.

Fig. 1 exemplifies a construction in which the supporting element is a ball bearing unit mounted directly in each bearing seat. Each of the bearing units thus exemplified includes an outer member 15 having a flange 16 at its inner end, and an inner member C which extends through the member 15. The inner surface of the member 15 at its junction with the flange 16 is curved to form a concavity, as shown. The inner member C is formed to provide three circumferential flanges, respectively marked 17, 18 and 19, and two circumferential channels, designated 20 and 21, respectively. The recess or channel 20 is concave and forms a race for a series of balls 22, and said balls are held against displacement therein by the co-operative action of the flanges 17 and 16, which flanges are so arranged with relation to each other and to the balls that opposite sides of the balls will contact the same. The flange 18 of the member C is shorter than the flange 17 and is arranged substantially within the flange 16 of the member 15, and the recess or channel 18 is positioned to receive a snap ring 23 which engages the flanges 16 and 18 and thereby holds the member C against outward displacement from the member 15. In short, the snap ring 23 and the flange 17 co-operate with each other and with the balls 22 and flanges 15 and 16 in preventing longitudinal relative displacement of the bearing members 15 and C at all times—that is, when the bearing unit has not been inserted into its bearing seat as well as when it has been inserted thereinto. In this particular embodiment, a pair of these bearing units are inserted by endwise pressure into the respective bearing seats until stopped by contact of their inner ends with the flanges 12. The members C of these bearing units are fixedly secured to a stationary roller-supporting shaft, near the opposite ends of the latter, and it will be apparent, therefore, that the roller body and the outer members 15 of its bearing units will unitarily rotate about the inner members C of said units and the shaft D, with a minimum of friction due to the interposition of the balls 20 between said bearing members. In the use of these rollers, in gravity or other conveyers, for example, the shafts D have their ends mounted in appropriate frame elements,—such, for example, as the illustrated elements E—and are held against displacement relatively thereto by the co-operative action of the outer ends of the bearing units and suitable fastening elements 24, which unit ends and fastening elements respectively engage opposite surfaces of the corresponding frame element E. This roller provides a very desirable construction for use in places wherein there is not apt to be sufficient moisture, dust or the like, to affect its operation by collecting in the bearing units.

For installations which on the other hand are to be employed in places in which the atmosphere is saturated with moisture or contains an excessive amount of solid impurities, as dust, and in places where frequent cleansing of the roller with water or other liquid, is necessary, as in dairies, etc., I prefer the construction illustrated in Fig. 3 in which the supporting element is a solid plug, $C^1$, forced under pressure tightly into the bearing seat until it comes to rest and bears closely against the backing flange 12. This flange is preferably prolonged, as compared with the corresponding flanges 12 illustrated in the other figures of the drawing, in order to engage the shaft, marked $D^1$, and form a tight fit about said shaft. In this embodiment, the plug $C^1$ is tightly fitted to the shaft, to which it is fixed by knurling the shaft, as shown, and it engages the circumferential and back walls of its seats. It will be noticed that in this construction the roller is completely sealed against all liability of the collection of moisture and solid impurities in the bearing seat or in the roller body; and it will be obvious, without illustration or further mention, that in practice each end of this roller body is formed to provide a seat in which a plug is inserted and that the shaft extends through and is fixedly secured to both plugs, and projects outward therefrom at both of its ends. These outwardly projecting ends of the shaft are supported by outside bearings of any suitable construction—of either plain or ball nature—in which the ends of the shafts are rotatably mounted. These bearings, one of which is marked $C^*$ in Fig. 3, are each supported by an appropriate frame member $E^1$, to which it is removably secured by clamping nuts, as $c^1$ and $c^2$, mounted on opposite sides of said frame member $E^1$. It will be apparent that by this construction a sanitary roller whose ends are completely sealed against the entrance of water or dirt into the roller, is provided and also that provision is made for easy replacement of the bearing $C^*$, which is readily removable from the frame. Obviously, the roller body, plug and shaft rotate as a unit with a pair of the bearing members $C^*$.

The serrations hereinbefore referred to are formed in the parts of the roller body from which the flanges 10, 11 and 12 are formed. These serrations, as shown in Fig. 5, are particularly shaped to provide a series of separated teeth each having its opposite sides extending from its base in a convergent relation for a certain part of its length (namely, from line $a$ to line $b$) thence substantially parallel with each other for a certain additional part of its length (from line $b$ to line $c$) and thence in a convergent relation from said line $c$ to its free end. The width of the different parts of the serrations between successive teeth having the described shape, and the lengths of the three parts of the teeth formed by said serrations, are such that when the teeth are bent over, on the line $a$ at right angles with the part from which they spring, and on the line $b$ inwardly parallel to the axis of and on the line $c$ inwardly toward the axis of the roller, the sides of the sucessive teeth between the lines $a$ and $b$ will come together and form the end flange 10, the sides of the successive teeth between the lines $b$ and $c$ will come together and form the flange 11 and the sides of the teeth from the line $c$ to the ends of the teeth will come together and form the lip 12. Thus said end member of the roller presents a solid appearing construction in which however, the gripping power of the seat upon the bearing unit or sealing plug is increased to a maximum extent. In addition, the bending operation is more easily accomplished. In said bending operation appropriate dies are used.

The method employed in the formation of a roller body forming the subject of the instant application for patent includes, as steps thereof, the formation of a tube, the formation of the serrations and the bending of the serrated portion to form the flanges 10, 11 and 12 having the relative location hereinbefore set forth. In that embodiment of the invention in which welds are not employed in effecting an integral union of the end members B with the intermediate tubular section A it is preferred, in practice, to form the serrations in the ends of a tube which, of course, is of a length sufficient to include said end members and intermediate section and to give the serrated portions the described shape in appropriate dies. In that embodiment of the invention in which the end members are formed separately from each other and from the intermediate section, said end members are separately formed, preferably from tubes of appropriate length and having the serrations extending at one end thereof, instead of at both ends as in the preceding embodiment. It would not be a departure from the substance of the invention in respect of the method to form the serrations in a flat sheet of steel of appropriate length before a tube including said serrations has been produced, but it may be preferred that the serrations be formed in a tubular member rather than in a flat sheet which is thereafter rolled, or otherwise converted into tubular form prior to the formation.

It will be apparent that these rollers are capable of being usefully employed not only as the beds of gravity conveyers, but also as supports for travelling conveyer belts and, in short, in any type of conveyer in which rollers are employed.

This application is a continuation in part of our co-pending application for Letters Patent of the United States filed August 9, 1930 and numbered, serially, 474,222.

Having thus described the invention what is believed to be new and therefore claimed, is:—

1. A conveyer roller body including a tubular circumferential part and end members having circumferential portions integrally united with opposite ends of said part, said circumferential part and end members being formed of sheet steel and each of said end members having serrations in one end thereof and its serrated end bent to form integral outer and inner spaced flanges arranged substantially perpendicular to the axis of the roller and connected with each other by a flange arranged concentric with said axis, said flanges forming an outwardly open resilient bearing seat having a back wall.

2. A conveyer roller body formed of a tubular circumferential part and end members having circumferential portions which are integrally united with opposite ends of the tubular circumferential part, said tubular circumferential part and end members being formed from sheet steel and each of said end members having serrations forming teeth which are bent to form integral outer and inner spaced flanges arranged substantially perpendicular to the axis of the roller and connected with each other by a flange arranged concentric with said axis and with the tubular circumferential part, said outer flange being arranged in the vertical plane of the end of the body and joining the circumferential portion of said body on an outwardly curved line and the flange which is concentric with the axis of the body joining the outer and inner perpendicular flanges on outwardly curved lines to form an outwardly open resilient bearing seat having a back wall.

3. A conveyer roller body according to claim 1, in which the tubular circumferential part of the body and the end members are formed from a unitary tube whose initial length is sufficient to include said part and end members.

4. A conveyer roller body according to claim 1 in which each end member is formed as a separate entity and the integral union between the tubular circular part of the body and circular portions of the end members is effected by butt welds.

5. A conveyer roller body comprising end members and an intermediate section whose ends are integrally united to said end members, each of said end members having an inwardly extending flange substantially concentric with the axis of the roller and terminating at its inner end in a ring-like part substantially perpendicular to said axis, the said flange and ring-like part being relatively disposed to form an outwardly open seat having a back wall, to engage the circumferential part and inner end of a supporting element by which the roller body is to be connected to a supporting shaft, and the part of each end member which is to form said seat being formed with serrations to facilitate the forming of said seat and to impart resilience thereto.

6. A conveyer roller formed from sheet steel and comprising a tubular circumferential body section and end members provided with circumferential portions which are integrally united with opposite ends of said body section and each of which has one of its ends formed with serrations and its said serrated end bent to form integral outer and inner spaced flanges arranged substantially perpendicular to the axis of the roller and connected with each other on outwardly curved lines by a flange arranged concentric with said axis, said flanges conjointly forming an outwardly open resilient bearing seat having a back wall, and supporting elements respectively mounted in said seats with their inner ends against the back walls thereof and having circumferential portions tightly embraced by the flanges which extend concentrically with the axis of the roller.

7. A conveyer roller comprising a tubular body and a shaft extending through said body at the axis thereof, said body including a tubular circumferential part and end members having circumferential portions integrally united with opposite ends of said part, each of said ends having serrations relatively arranged to provide bendable teeth correlated to form an outwardly open seat having a circumferential wall and a back wall, and a sealing plug tightly fitted under pressure in said seat with its circumferential portion in close engagement with the circumferential wall of the seat and its inner surface in close engagement with the back wall of the seat, said back wall and plug having registering openings through which the shaft extends and said plug being tightly fitted on and rotative with said shaft, whereby the ends of the roller are completely sealed against the admission of dust and moisture, said shaft extending outwardly from the plug to engage a bearing member.

8. A conveyer roller comprising a tubular body member and end members integrally united with said body member, each of said end members having serrations and being bent to include an outer end flange and an inwardly extending resilient seat substantially concentric with the axis of the roller, and also to include an inner ring-like flange, substantially parallel with said outer end part and forming a back wall for said seat; said serrations being formed in the part of the metal which includes said seat and back wall and so shaped that when the metal is bent to form the outer end flange and the seat and inner ring-like part, the edges of successive serrations will come together into an abutting relationship.

9. A conveyer roller including a tubular body member and end members, formed from a single piece of steel tubing whose ends are serrated and bent to form the end members, and each of whose said end members includes an inner axial resilient seat having a back wall and an outer flange perpendicular to said seat, said serrations extending through said seat, back wall and flange, and being so shaped that successive edges thereof will be brought into an abutting relationship in the bending operation.

10. A conveyer roller according to claim 9 in which the serrated end of each end member includes a series of teeth each of which has its opposite edges arranged convergently for a part of the length of the tooth to form said outer flange and thence along substantially parallel lines to form the axial seat and thence along convergent lines to form said back wall.

11. A conveyer roller according to claim 1, in which the serrations in each end member include a series of bendable teeth each of whose edges are in an abutting relationship with the edges of the teeth on opposite sides thereof, each of said teeth having its opposite edges arranged convergently for a part of the length of the tooth and thence along substantially parallel lines and thence along convergent lines.

MERVIN L. WATSON.
JOHN C. WALTER.